Patented May 2, 1950

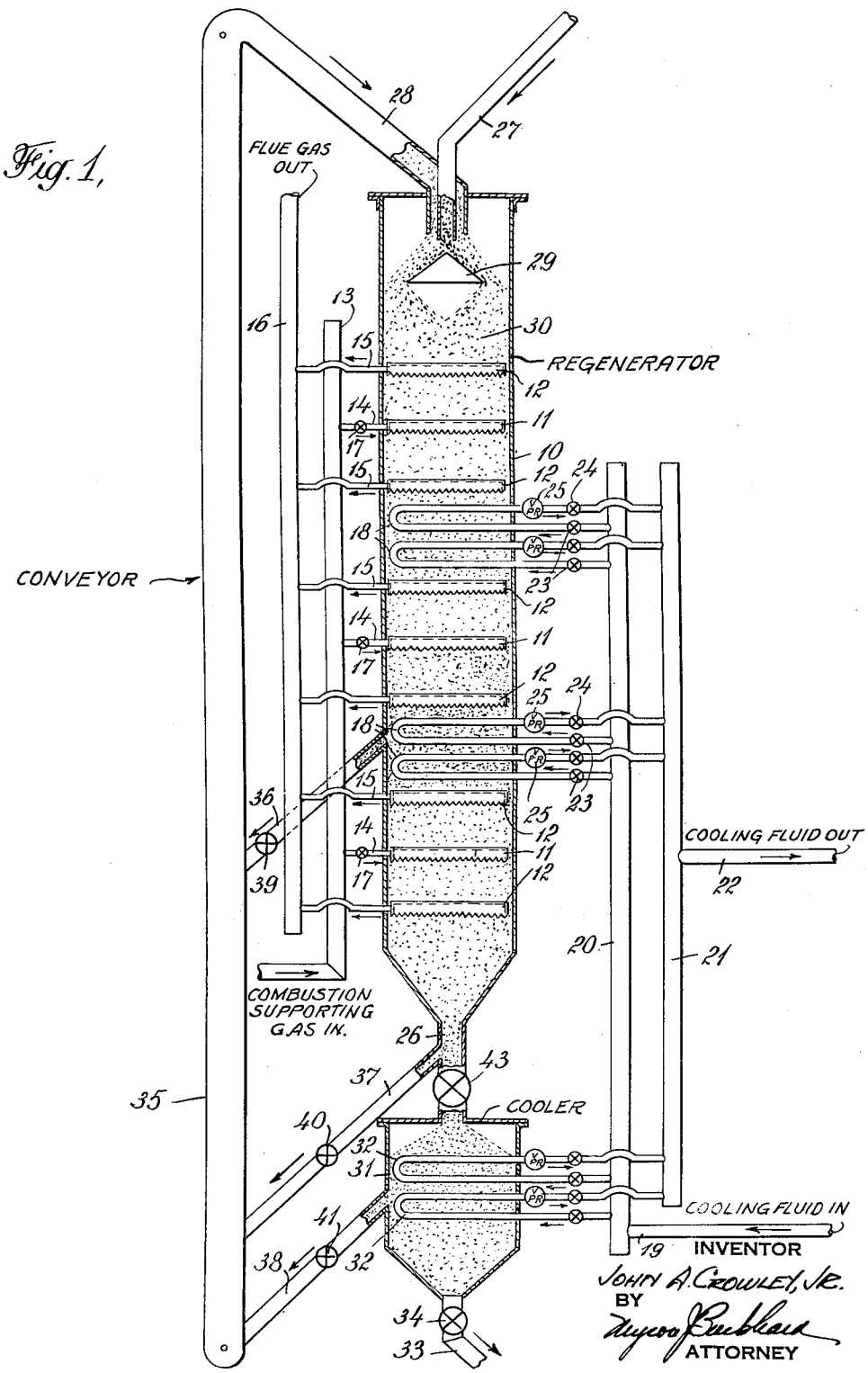

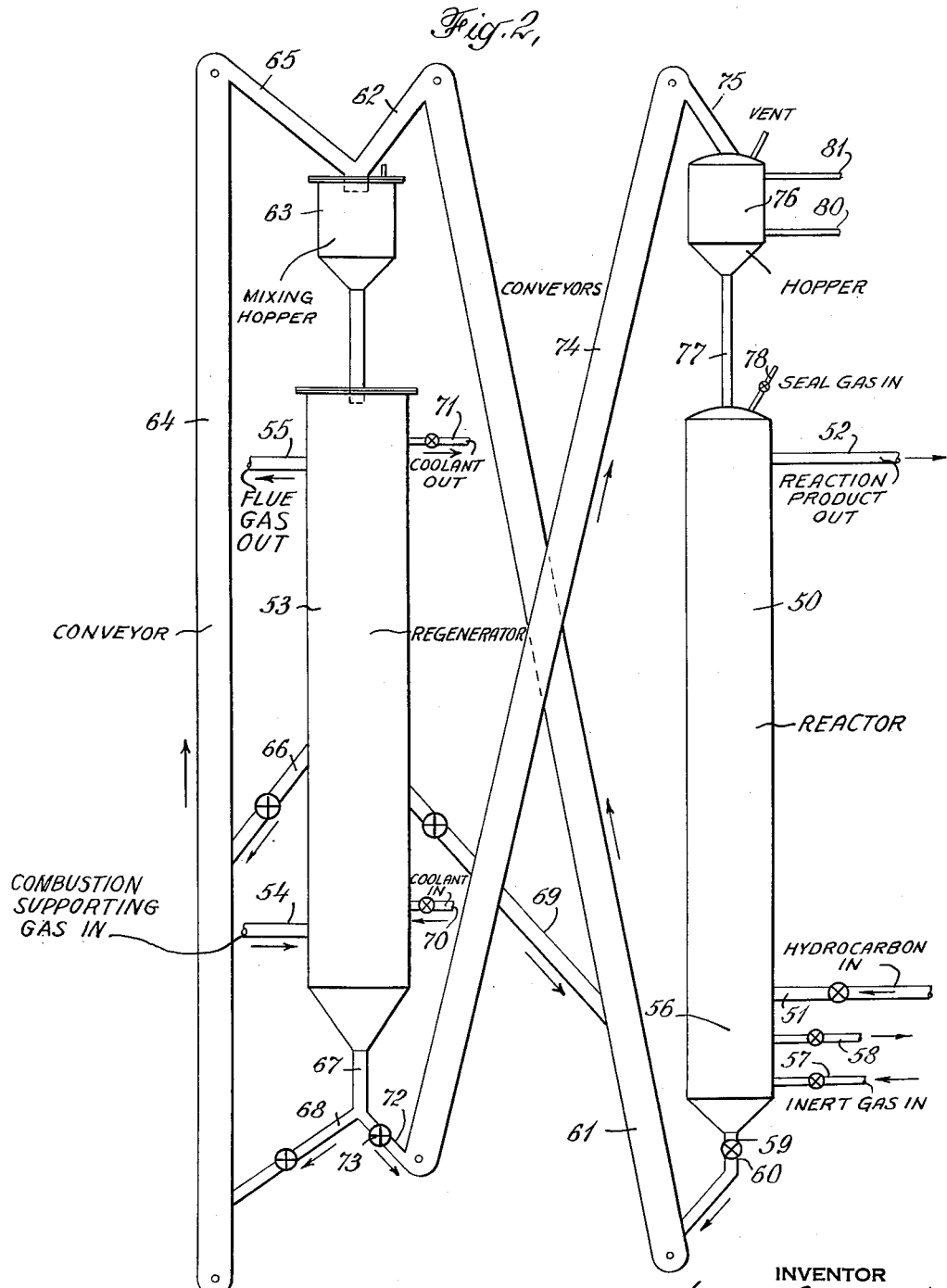

2,506,54..

UNITED STATES PATENT OFFICE 2,506,545

METHOD FOR REGENERATING SPENT CONTACT MASS MATERIALS

John A. Crowley, Jr., Scarsdale, N. Y., assignor to Socony-Vacuum Oil Company, Incorporated, a corporation of New York Application November 2, 1945, Serial No. 626,423

9 Claims. (Cl. 252—418)

This invention relates to the regeneration of finely divided contact mass materials which have been used in processes tending to exhaust the utility of the contact mass by the deposition of contaminant deposits thereon. Exemplary of such processes are the filtering or contacting of petroleum oils with adsorbents for the purposes of removing color bodies and gum forming materials, the catalytic cracking conversion of hydrocarbons, catalytic reforming of light hydrocarbons, catalytic desulfurization of hydrocarbons, catalytic hydrogenation and dehydrogenation of hydrocarbon vapors, catalytic polymerization of hydrocarbons and hydrocarbon synthesis over adsorbent contact masses. The contact mass materials are generally adsorbent in nature such as natural clays, treated clays, bauxites, and synthetic associations of silica, alumina or silica and alumina to which other constituents such as metallic oxides may be added for special purposes. The contact mass material particle size may vary over a wide range of from about 6 to 300 mesh depending upon the requirements of the particular process involved. Thus for example, in a petroleum percolator or moving bed type of conversion process the particle sizes may preferably range from 6–60 mesh with small amounts of finer material present.

When such adsorbent contact mass materials are used for such processes, as listed above, their adsorbent powers or catalytic activities gradually decrease due to the deposition thereon of liquid or solid materials of combustible nature such as oily or tarry or carbonaceous deposits consisting principally of carbon and varying amounts of hydrogen and other impurities such as sulfur compounds. If contact mass materials bearing such deposits are heated to a temperature sufficient to cause practicable ignition of the contaminant deposits, these deposits may be burned off of the contact mass with a suitable combustion supporting gas such as air. The ignition temperature of such contaminants varies depending upon the nature thereof which in turn depends upon the nature and conditions of operation of the process in which the contact mass material is utilized.

In some operations the processes utilizing the contact mass material involve reactant conversion temperatures which are above the ignition temperature of the contaminant deposit so as to permit immediate regeneration of the contact mass without necessity for preheating. Exemplary is the catalytic cracking conversion of light hydrocarbon gas oil vapors over catalysts at temperatures of the order of 800° F. and upwards for the production of gasoline and gaseous products. However, in some hydrocarbon cracking processes and especially in gasoline reforming and treating processes, lower temperatures may be employed and carbonaceous contaminants are encountered which have relatively high contaminant ignition temperatures which may be of the order of about 850° F. Obviously in such processes the contact mass material requires preheating prior to regeneration thereof. An important process falling within this latter class is the percolation of hydrocarbon oils over adsorbents at temperatures which may be as low as ordinary atmospheric temperatures. The spent adsorbents from such processes exist initially at temperatures of the order of atmospheric temperatures and may contain contaminants having a practical ignition temperature of the order of 700° F. The instant invention is specifically directed to a method for regenerating spent contact mass materials existing at a temperature substantially below the practicable ignition temperature of the contaminants deposited thereon. Heretofore such contact mass materials have been regenerated by subjecting them to a preliminary preheating operation involving exchange of heat from a heat exchange gas or liquid to the contact mass material either by direct or indirect heat transfer. Exemplary of such methods is that shown in the United States Patent 2,227,416 issued in 1940 to Payne.

A major object of this invention is the provision in a process for regeneration by burning of spent contact mass materials containing carbonaceous contaminants and existing at a temperature below the lowest temperature practicable for combustion regeneration, of a method for preparing said contact mass for the contaminant burning without the requirements of preheating with extraneous heat exchange liquids or gaseous materials.

An important object of this invention is the provision of a method for regeneration of spent finely divided contact mass materials bearing carbonaceous contaminants and existing below a temperature adequate to support practicable combustion of said contaminants, which method permits the burning of said contaminants with a combustion supporting gas and the utilization of combustion heat for preheating said contact mass material to contaminant combustion temperatures all without the requirement for preheating by means of heat exchange liquids or gases.

A specific object of this invention is the provision of a method for regeneration of spent petroleum filtering adsorbents by burning which method accomplishes the proper conditioning of the spent adsorbents for burning without the requirements for external preheating heat supply or heat exchange liquids or gases for preheating.

Another specific object of this invention is the provision of a method for regeneration of spent hydrocarbon conversion catalysts existing at temperatures below the lowest temperature practicable for burning of the contaminants thereon which method accomplishes the burning regeneration of the catalyst without requirement for devotion of portions of expensive regeneration zones or of indirect heat exchange zones for the preheating of the catalyst.

These and other objects of this invention will become apparent from the following description of the drawings.

The method of this invention in its broad form involves the step of mixing with the spent contact material prior to the burning of the contaminants therefrom of a sufficient amount of partially regenerated hot contact material to heat said spent contact material at least to a temperature which will support practicable combustion of the contaminant deposit. This method eliminates the necessity for preheating the spent contact material by indirect heat transfer with externally heated heat exchange mediums or the preheating of the spent contact material by direct contact with hot gases in the upper section of a regeneration zone. Either of these prior art methods require the utilization of complicated and expensive equiment for the mere preheating of the contact material and also generally involve the sacrifice of a substantial portion of the expensive regeneration chamber for preheating purposes thereby decreasing the regenerator capacity and greatly increasing the cost of the regeneration process. These prior art processes involve the additional process cost of pumping or compressing the heat exchange medium and most of the processes also involve the cost of supplying heat for the contact mass preheating from an external source.

Before proceeding with a description of the drawings attached hereto, several terms used in describing and in claiming this invention will be defined. The terms "gas" or "gaseous material" as used herein are intended in a sense sufficiently broad to include any material in the gaseous phase under the temperature and pressure conditions involved regardless of its normal phase at ordinary atmospheric conditions. The terms "temperature below that practicable for initiation of combustion regeneration" and "the lowest temperature practicable for initiation of combustion regeneration" and the like are intended to mean the lowest temperature at which the particular contaminant deposited on the contact mass material will, upon contact with a combustion supporting gas, start to burn at a practicable initial burning rate such as will permit the initiation of burning in a commercial equipment of reasonable size. Such a minimum practicable initial burning rate in kiln of present design is of the order of about 0.1 to about 0.4 pounds of carbon per hour per cubic foot of contact mass volume in the initial burning zone. It will be understood that the contaminant may also contain hydrogen and various other materials in lesser degree but it has been found that the amount of contaminant present and burned may be conveniently expressed on the basis of the carbon content of the contaminant as above. It will be further understood that once combustion is initiated, the contact material temperature will rise thereby permitting much higher burning rates for most of the regeneration period than the above specified practicable minimum. By the term "a temperature which would cause heat damage to the contact mass material" and like terms is meant a temperature which would cause permanent loss of the adsorbent or catalytic properties of the contact mass material so that its efficiency for the process in which it is used would be permanently materially decreased. By the term "spent" used in conjunction with the terms "adsorbent," "clay," or "contact mass material" is meant contact mass material, etc., containing sufficient contaminant deposits to materially decrease its effectiveness for the process in which it is utilized. By the terms "hot contact mass material" and "hot adsorbent" are meant contact mass material which exists at a temperature substantially above that lowest temperature practicable for initiation of combustion of the contaminant on the spent contact material charged to the regenerator.

Referring now to the drawings for a better understanding of this invention, Figure 1 is an elevational view, partially in section, of a preferred arrangement of apparatus for conducting the process of this invention, and Figure 2 is an elevational view showing the application of a modified regenerator adapted for the method of this invention and arranged for use in a cyclic hydrocarbon conversion system. Both of these drawings are highly diagrammatic in form.

Turning now to Figure 1, we find an elongated vertical regenerator shell 10 which may be of any practical cross-sectional shape. The vessel 10 is divided into three superposed burning zones each having a row of horizontal distributor troughs 11 located substantially midway between two rows of spaced outlet troughs 12. The inlet troughs are supplied from a manifold 13 through pipes 14 while gas is withdrawn through pipes 15 to a gas outlet manifold 16. Valves 17 are provided on the gas inlet pipes to permit control of gas rate to each zone. The gas outlet troughs 12 in adjacent zones are sufficiently spaced apart to provide a zone therebetween which will be substantially free of gas flow. In these intermediate zones cooling coils or tubes 18 are provided. Cooling medium may be supplied to these coils from an external source (not shown) through conduit 19 and inlet manifold 20. Cooling medium may be withdrawn from the coils through manifold 21 and conduit 22. Control valves 23 and 24 are provided on the coil inlets and outlets respectively, and safety pressure release valves 25 are also provided on the coil outlets. Such cooling medium may be a liquid such as certain low melting point alloys of lead and certain inorganic fused salts, or it may be a gas such as steam, flue gas, air preferably under pressure. It will be understood that the arrangement shown is highly diagrammatic in form and the invention is not intended to be limited thereto.

It will be clear to those skilled in the art that a number of equivalent modified arrangements adapted for providing solid cooling by indirect heat transfer with a cooling fluid may be substituted for the precise arrangement shown. The same is true of the gas inlet and outlet arrangements. It should be further understood as regards the gas inlet and outlets that each burning zone may, if desired, be provided with a single row of gas inlet distributors and a single row of gas outlet collectors or an equal plurality of rows of gas inlets and outlets. The vessel 10 is also provided at its lower end with an outlet conduit 26 and at its upper end with a spent adsorbent inlet conduit 27. Also provided at the upper end of vessel 10 and arranged concentrically with the outlet end of conduit 27 is a hot recycle adsorbent inlet conduit 28. A baffle 29 of inverted conical or other suitable shape is positioned directly below the solid inlets to provide mixing of the two solid streams. It will be understood that other means well known to the art and adapted to provide mixing of two streams of solid material may be substituted for the arrangement shown. It will be observed that below the baffle 29 and above the uppermost burning zone a surge zone or hopper 30 is provided to insure constant supply of solid material to the uppermost burning zone. Below the vessel 10 is provided a cooler 31 provided with cooling coils 32 also connected to manifolds 20 and 21. A cooled regenerated adsorbent outlet conduit 33 having throttle valve 34 thereon is provided at the lower end of cooler 31. A conveyor 35, which may be any of a number of known types adapted for solid particle transfer is provided for recycle of hot adsorbent to the upper end of the regenerator. Conduit 36 extending from an intermediate level along the regenerator, conduit 37 extending from the regenerator discharge and conduit 38 extending from cooler 31 are all provided for optional supply of hot adsorbent to the conveyor 35. Valves 39, 40 and 41 are provided on conduits 36, 37 and 38 respectively, to permit selective withdrawal of solid adsorbent from the desired location. Means to withdraw hot adsorbent from other locations in the regenerator below the uppermost burning zone may be provided, if desired.

For purposes of example, the operation of the apparatus according to this invention for the regeneration of a spent petroleum percolation adsorbent may be considered. In operation spent adsorbent bearing a contaminant deposit and existing at a temperature below the lowest temperature practicable for the initiation of the contaminant combustion, for example 100° F., is supplied through conduit 27 into the surge zone 30 from which it flows downwardly through the burning and cooling zones as a substantially compact column of downwardly moving particles. The lowest temperature practicable for initiation of combustion of the particular contaminant involved may be of the order of about 700° F. In order to preheat the spent contact material, hot and at least partially regenerated adsorbent is conducted from conveyor 35 through conduit 28 into the top of vessel 10 to mix with the spent adsorbent. The amount of hot adsorbent so added should be sufficient at least to heat the spent adsorbent in this example to 700° F. The mixed adsorbent passes through the successive burning zones in each of which it is contacted with a combustion supporting gas such as air which may or may not be preheated and which is introduced from manifold 13 through pipes 14 and distributor trough 11 and withdrawn through collector troughs 12, pipes 15 and manifold 16. Since the combustion occurs in each burning zone in the absence of cooling by indirect heat transfer, the adsorbent temperature rapidly rises, the rise in each zone depending upon the amount of contaminant burned and its nature. In order to prevent the adsorbent from reaching a temperature at which its adsorbent properties which particularly adapt it for petroleum percolation are permanently damaged, the adsorbent must be cooled between at least most of the burning zones. For percolation adsorbents the temperature above which the adsorbent will be heat damaged is of the order of about 1200° F. For certain adsorbent catalysts, particularly synthetic gel catalysts, the critical heat damaging temperature may be higher, of the order of 1400° F., for example. So in the present example adsorbent material may pass from the uppermost burning zone at about 1050° F., be then cooled to about 900° F., rise again to about 1150° F. in the second burning zone, be subsequently cooled again to 900° F. and again rise to about 1100–1150° F. in the last burning zone. Hot regenerated adsorbent then passes through conduit 26 and control valve 43 thereon into cooler 31, wherein it is cooled to a temperature suitable for subsequent use as a percolation adsorbent, for example 100° F. The regenerated adsorbent discharged through conduit 33 to storage may contain small residual and unobjectionable amounts of contaminant of the order of about 0.1 to 0.5% by weight carbon.

The hot adsorbent used for mixing with the spent adsorbent at least should be partially regenerated and may, if desired, be obtained from an external source. It is more economical and preferable to employ some of the heat of contaminant combustion for the purpose of preheating the spent adsorbent, so that generally the hot adsorbent is obtained from some location below the first burning zone. Thus partially regenerated adsorbent at a temperature of the order of 1000–1050° F., depending upon the exact location of withdrawal may be withdrawn from vessel 10 through a conduit such as 36. Generally it is preferable to recycle the hottest possible adsorbent and the most thoroughly regenerated adsorbent so that generally it is preferable to recycle adsorbent from the regenerator discharge through conduit 37 to the top of the regenerator. In some cases partially cooled adsorbent, at about 900° F., for example, may be recycled from cooler 31 by withdrawal therefrom through conduit 38.

In the above example, it was assumed that three burning zones were sufficient to permit burning of substantially all of the contaminant deposit on the mixed adsorbent charge. The number of burning zones actually required for any particular operation will, of course, vary depending upon the nature and amount of the contaminant deposited on the adsorbent charge. Generally for those burning zones below the first zone in which combustion is initiated, the zone size should be such as to permit burning of the order of 0.2 to 0.6 percent carbon by weight of the mixed adsorbent charge per zone. In cases involving very heavy contaminant deposits up to 10 or 15 burning zones may be required for proper regeneration of the adsorbent. The amount of cooling required between any two zones will, of course, depend upon the expected heat release in the next burning zone and on the minimum temperature to which the adsorbent may be cooled without decreasing the burning rate below a practicable rate. The latter minimum temperatures may vary from 800° F. during the early stages of the regeneration to as high as 1000° F. during the later stages of the regeneration. While generally cooling is required between each burning zone, in some operations cooling between some of the uppermost and lowermost burning zones may be unnecessary. In some operations by proper modification of the cooling zones, the cooling fluid may comprise an inert gas passed directly through the adsorbent mass in the cooling zones or even cooled adsorbent material added to the adsorbent material in each cooling zone. Generally the adsorbent residence time in each burning zone may vary from 2 to 15 minutes.

While the above described multi-stage alternate burning and cooling type of method with hot, and at least partially regenerated adsorbent recycle is the preferred form of this invention, it should be understood that the instant method in its broader aspects is not limited to the particular regeneration process described but is broadly applicable to any process wherein a spent adsorbent existing at a temperature below that which is practicable for initiation of contaminant combustion is moved through a confined regeneration zone for the purpose of burning off the contaminant deposit. Thus the regenerator may take the form of one in which heat transfer tubes are provided throughout the burning zone, and it may comprise a single zone vessel or a multi-stage vessel. In every application of the invention, however, the same fundamental concept is involved, namely, that an amount of hot at least partially regenerated contact mass material is mixed with the spent contact material which is sufficient to heat the spent contact material from an existing temperature substantially below the lowest temperature practicable for initiation of combustion of the particular contaminant deposited thereon to a temperature at least equal to said lowest practicable temperature. It will be understood that the lowest practicable ignition temperature may vary depending upon the nature of the contaminant deposit. It has been found that when the contaminant deposit is rich in hydrogen, for example a molal hydrogen to carbon ratio above about 1, the combustion initiation temperature may be as low as about 700° F. whereas deposits deficient in hydrogen, for example molal hydrogen to carbon ratios below about 0.4, may require temperatures of 850° F. or higher for practical operations. As has been pointed out hereinabove, the lowest practical combustion initiation temperature is that temperature below which the initial burning rate of the contaminant will be less than about 0.1 to about 0.4 pounds of carbon per hour per cubic foot of contact mass volume in the initial burning zone. In view of this it will be apparent that the lowest practicable combustion initiation temperature for any given contaminant deposit may be determined by relatively simple routine experimental methods well known to those skilled in the art.

It will be obvious that the proper mixing ratio of hot and spent contact mass material will depend upon both the temperature of the hot and the temperature of the spent contact material as well as upon the lowest temperature practicable for combustion initiation. In general it has been found that the ratio of hot to spent contact material may vary from about 0.5 to 10 parts hot material to one part spent material. In some operations it is advantageous to recycle substantially more hot contact material than the required minimum so as to provide a higher initial combustion rate and/or so as to avoid other difficulties which occur in the case of very heavy contaminant deposits.

Turning now to Figure 2, we find an apparatus arrangement adapted for incorporation of the method of this invention in a cyclic catalytic conversion process such as a gasoline or naphtha treating or reforming process. In such a process particle form contact mass material may be moved cyclically through a reactor 50 wherein it is contacted with hydrocarbon vapors introduced at conduit 51 and withdrawn at conduit 52 or vice versa and then through a regenerator 53 wherein it is contacted with air introduced through conduit 54 and withdrawn through conduit 55 for the purpose of burning off from the contact material the carbonaceous contaminant deposited thereon in the reactor. The contact mass material may pass through both vessels as a substantially compact column of downwardly moving solid particles. In operation contact mass material is pumped substantially free of hydrocarbons in purge zone 56 by means of a purge gas such as steam or flue gas admitted at conduit 57 and withdrawn at conduit 58. The purged spent contact mass material which may be at a temperature of the order of 750° F. passes from vessel 50 through conduit 59 and flow control valve 60 to conveyor 61 which may be of any of a number of types such as a continuous bucket elevator. The spent adsorbent discharges from conveyor 61 through conduit 62 into surge and mixing hopper 63 wherein it is mixed with, at least partially regenerated hot contact mass material admitted from conveyor 64 through conduit 65. In this operation the contaminant deposit on the spent contact mass material may contain less than 1% carbon by weight of the spent contact mass material and its lowest practicable combustion initiation temperature may be of the order of about 850° F. The hot contact mass material, which is obtained either from an intermediate section of the regenerator by withdrawal through conduit 66 or from the regenerator discharge by withdrawal through conduits 67 and 68, should be at a temperature substantially above 850° F. As an alternative to the use of conveyor 64, the hot contact material may be passed directly from an intermediate or lower section of the regenerator into the spent contact material conveyor 61, thereby eliminating the necessity for an extra conveyor for material recycle. Such a withdrawal line is shown at 69. The contact material temperature is controlled below a heat damaging level by means of a cooling medium introduced at 70 and passed through tubes (not shown) within the regeneration zone and finally withdrawn at 71. It will be understood that the multi-stage type regenerator described hereinabove may be substituted for the single stage vessel 53. Regenerated contact mass material passes from the bottom of the regenerator through conduits 67 and 72 and control valve 73 to conveyor 74 by which it is transferred to conduit or chute 75 feeding the hopper 76 above the reactor. A cooling medium introduced at 80 and withdrawn at 81 may be passed in heat exchange relationship with the contact mass material in the hopper 76 to cool the contact mass material to a suitable conversion temperature which may be of the order of 750 to 800° F. in this example. The contact material then passes to the reactor 50 via the gravity feed leg 77, which, in cooperation with a seal gas introduced into the top of vessel 50 through conduit 78, serves to seal the reactor from the external atmosphere.

It will be understood that the examples of operating conditions and particular application of this invention are intended by way of example and are not to be construed as limiting the scope of this invention except as it may be limited by the following claims.

I claim:
1. The method of regenerating spent particles of petroleum percolation clay which are at substantially atmospheric temperature and which bear contaminant deposits and by burning off the deposits thereon with air which method comprises: passing said spent clay through a confined regeneration zone, passing air into contact with said clay within said zone to burn said deposits, controlling the temperature of said clay within said zone by cooling below a temperature which would cause heat damage to said clay but above contaminant combustion temperature and mixing with said spent clay before its passage through said zone at least partially regenerated clay which is at a temperature substantially above the lowest temperature practicable for initiation of combustion of said deposits and at a sufficient rate to heat said spent clay from about atmospheric temperature at least to a temperature which is practicable for initiation of the combustion of said deposits.

2. In a process wherein a spent inorganic contact mass material bearing a contaminant deposit is regenerated by passage through a regeneration zone in which it is contacted with a combustion supporting gas acting to burn off said contaminant deposit and wherein said contact mass is at an initial temperature below that at which the contaminant will burn at a rate of at least 0.1 pound of carbon per hour per cubic foot of contact mass volume in the regeneration zone the improvement which comprises: mixing with said spent contact mass prior to its passage through said regeneration zone a quantity of at least partially regenerated contact mass which is at a temperature substantially above the practicable initial contaminant combustion temperature, which quantity is sufficient to heat said spent contact mass at least to a practicable initial contaminant combustion temperature.

3. The method of regenerating a spent particle form, inorganic solid adsorbent material containing carbonaceous contaminants and being substantially at atmospheric temperature which method comprises: mixing said spent adsorbent material which is substantially at atmospheric temperature with a quantity of at least partially regenerated hot absorbent material which is at a temperature substantially above that required for initiating contaminant combustion sufficient to heat said spent adsorbent at least to a temperature suitable for initiating contaminant combustion, passing said mixture through a confined regeneration zone at a suitable contaminant combustion temperature level and passing a combustion supporting gas through said zone in contact with said adsorbent material, and directly returning a portion of the hot adsorbent material from said zone to the location of said mixing for mixing with said spent adsorbent material.

4. The method of regenerating a spent particle form, inorganic solid adsorbent material containing carbonaceous contaminants and being at a temperature below the lowest temperature practicable for initiation of combustion of said contaminants which method comprises: passing said spent absorbent material through an elongated confined zone, as a substantially compact column of downwardly moving particles, supplying said column at its upper end with spent adsorbent which is at approximately atmospheric temperature, withdrawing regenerated adsorbent from the lower end of said column, contacting said adsorbent material with a combustion supporting gas within said zone to burn said contaminants, cooling said adsorbent material within said zone sufficiently to limit its temperature below that which would cause heat damage to said adsorbent material but insufficiently to cool the adsorbent below the contaminant combustion temperature, and recycling hot, at least partially regenerated, adsorbent material withdrawn from a point along said zone at a temperature substantially above that required for initiation of contaminant combustion to the inlet to said zone at a sufficient rate to heat said spent adsorbent material entering said zone to at least to a temperature practicable for initiation of contaminant combustion.

5. The method of regenerating a spent particle form, inorganic solid adsorbent material containing carbonaceous contaminants and being at a temperature below the lowest temperature practicable for initiating combustion of said contaminants which method comprises: introducing said spent adsorbent material into the upper section of a substantially upright elongated zone at a temperature of the order of about 100° F., passing it through said zone as a substantially compact column of downwardly moving particles while contacting it within said zone with a combustion supporting gas acting to burn off said contaminants from said adsorbent material and while controlling the temperature of said adsorbent material during its passage through said zone at contaminant combustion temperatures which are below that which would cause heat damage thereto, withdrawing regenerated adsorbent material from the lower section of said zone at a temperature substantially above that required to support practical initial combustion of said contaminants and recycling a portion of said hot regenerated solid adsorbent to the upper section of said zone at a rate at least sufficient to heat said spent adsorbent to a temperature which will support practical initial combustion of said contaminants.

6. The method of regenerating spent particles of petroleum percolation adsorbent bearing carbonaceous contaminants having an average hydrogen to carbon ratio above about 1 mol hydrogen per mol of carbon and being at approximately atmospheric temperature by burning off the contaminants therein with air which method comprises: mixing with said spent adsorbent which is at approximately atmospheric temperature a quantity of at least partially regenerated adsorbent existing at a temperature substantially above about 700 degrees Fahrenheit which quantity is sufficient to heat said spent adsorbent at least to about 700 degrees Fahrenheit, passing said mixture through a confined regeneration zone at temperature above 700° F. and passing air into contact with said adsorbent within said zone to burn said contaminants from said adsorbent.

7. An improved method for regenerating a spent inorganic contact mass material, which contact material contains carbonaceous contaminants having a molecular hydrogen to carbon ratio below 0.4 and which is at a temperature below about 850 degrees Fahrenheit, by burning off said contaminants with a combustion supporting gas which method is characterized by the step of mixing with said spent contact mass material prior to burning off said contaminants a sufficient amount of at least partially regenerated contact mass material which is at a temperature substantially above about 850 degrees Fahrenheit to heat said spent contact material at least to about 850 degrees Fahrenheit.

8. The method of regenerating spent particle form, inorganic contact mass materials which bear carbonaceous contaminants having an average hydrogen to carbon ratio below about 0.4 and which are below about 850 degrees Fahrenheit which method comprises: passing said spent contact mass material as a substantially compact column of downwardly moving particles through an elongated vertical regeneration zone, passing an oxygen containing gas through the contact material in said regeneration zone to burn said contaminants, controlling the contact material temperature in said regeneration zone at contaminant combustion temperatures which are below a heat damaging level, withdrawing hot regenerated contact material from the lower section of said regeneration zone at a temperature substantially above 850 degrees Fahrenheit, and recycling a portion of said regenerated contact mass material through said regeneration zone along with said spent contact mass material in sufficient amounts to heat said spent contact mass material prior to contaminant burning to at least about 850 degrees Fahrenheit.

9. The method of regenerating spent particle form petroleum percolation adsorbent which bear carbonaceous contaminant having an average hydrogen to carbon molecular ratio above about 1.0 and which are at a temperature level of approximately 100° F. which method comprises: passing said spent adsorbent through an elongated confined zone as a substantially compact column of downwardly flowing particles, passing air through said adsorbent within said zone to burn off said contaminants therefrom, passing a cooling fluid in heat exchange relationship with said adsorbent within said zone to limit its temperature below about 1200 degrees Fahrenheit without cooling the adsorbent below 700° F., withdrawing hot regenerated adsorbent from the lower end of said zone at a temperature substantially above 700° F. and adding a portion of said hot adsorbent without cooling to said spent adsorbent passing to said zone in amounts sufficient to heat said spent adsorbent from an initial temperature level of the order of about 100° F. to at least about 700 degrees Fahrenheit.

JOHN A. CROWLEY, Jr.

REFERENCES CITED

The following references are of record in the file of this patent:

UNITED STATES PATENTS

| Number | Name | Date |
| --- | --- | --- |
| 1,598,967 | Hiller | Sept. 7, 1926 |
| 2,226,535 | Payne | Dec. 31, 1940 |
| 2,344,449 | Ogorzaly | Mar. 14, 1944 |
| 2,387,936 | Nicholls et al. | Oct. 30, 1945 |
| 2,409,234 | Arveson | Oct. 15, 1946 |
| 2,409,596 | Simpson et al. | Oct. 15, 1946 |
| 2,417,275 | Thompson et al. | Mar. 11, 1947 |